United States Patent
Bronstein

(10) Patent No.: US 7,467,411 B2
(45) Date of Patent: Dec. 16, 2008

(54) PROTECTING A SERVICE PROVIDER FROM ABUSE

(75) Inventor: Alexandre Bronstein, Palo Alto, CA (US)

(73) Assignee: ASTAV, Inc., Pacifica, CA (US)

( * ) Notice: Subject to any disclaimer, the term of this patent is extended or adjusted under 35 U.S.C. 154(b) by 703 days.

(21) Appl. No.: 10/928,078

(22) Filed: Aug. 27, 2004

(65) Prior Publication Data

US 2006/0048229 A1    Mar. 2, 2006

(51) Int. Cl.
*H04L 9/32* (2006.01)
(52) U.S. Cl. .................................. 726/26; 726/27
(58) Field of Classification Search ............. 380/46; 713/165, 167–168, 182, 186; 726/1, 26–28
See application file for complete search history.

(56) References Cited

U.S. PATENT DOCUMENTS

| | | | |
|---|---|---|---|
| 7,254,781 B1 * | 8/2007 | Land et al. | 715/760 |
| 2002/0128844 A1 * | 9/2002 | Wilson et al. | 704/270 |
| 2002/0178271 A1 | 11/2002 | Graham et al. | |
| 2002/0194140 A1 | 12/2002 | Makuck | |
| 2003/0152198 A1 * | 8/2003 | Price | 379/67.1 |

FOREIGN PATENT DOCUMENTS

GB    2367976 A    4/2002

* cited by examiner

*Primary Examiner*—Hosuk Song

(57) ABSTRACT

Techniques for protecting a service provider from abuse include methods for protecting an object that is intended to be rendered to an authentic human client of the service provider from capture as well as methods for protecting against using low-paid laborers to abuse a service provider.

17 Claims, 4 Drawing Sheets

PROTECTING A SERVICE PROVIDER FROM ABUSE

BACKGROUND

A service provider may provide a variety of computer-related services that are intended for use by individuals. Examples of computer-related services that may be intended for use by individuals include email services, personal web page services, personal data storage services, web access accounts, etc.

A service provider may be vulnerable to abuse by unscrupulous parties who misuse computer-related services that are intended for use by individuals. For example, an unscrupulous party may create numerous accounts with a free email service that is intended for individuals and then abuse the obtained email accounts for mass mailings of spam. Similarly, an unscrupulous party may create numerous free personal web page accounts that are intended for individuals and then abuse the web page accounts by storing large volumes of information on the obtained web storage space.

A service provider may attempt to prevent abuse of their services by screening applicants for their services. For example, a service provider may generate a registration web page that presents a human test that includes one or more test objects. The test objects may be used to determine whether an applicant for their services is a human being or a software program that mimics human behavior. For example, a test object may be an image of a stylized decimal number that is intended to test the human capability to recognize stylized numbers. A human being may pass the human test by providing an answer to one or more questions pertaining to the test objects.

Unfortunately, an abusive party may defeat a human test by capturing the test objects and presenting the test objects to an unsuspecting human being. For example, an abusive party may capture a test object from a registration web form and then re-create the human test in an entrance web page of a web site that has been created by the abusive party to be enticing to human beings, e.g. a pornographic web site. A human being seeking access to the enticing web site may provide a correct answer to the human test. The answer to the captured human test may then be used in an answer back at the registration web page of the service provider. In addition, an abusive party may employ low-paid laborers, e.g. individuals in developing countries, who are capable of repeatedly passing a human test to create numerous accounts with a service provider.

SUMMARY OF THE INVENTION

Techniques are disclosed for protecting a service provider from abuse. The present techniques include methods for protecting an object that is intended to be rendered to an authentic human client of the service provider from capture as well as methods for protecting against using low-paid laborers to abuse a service provider.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
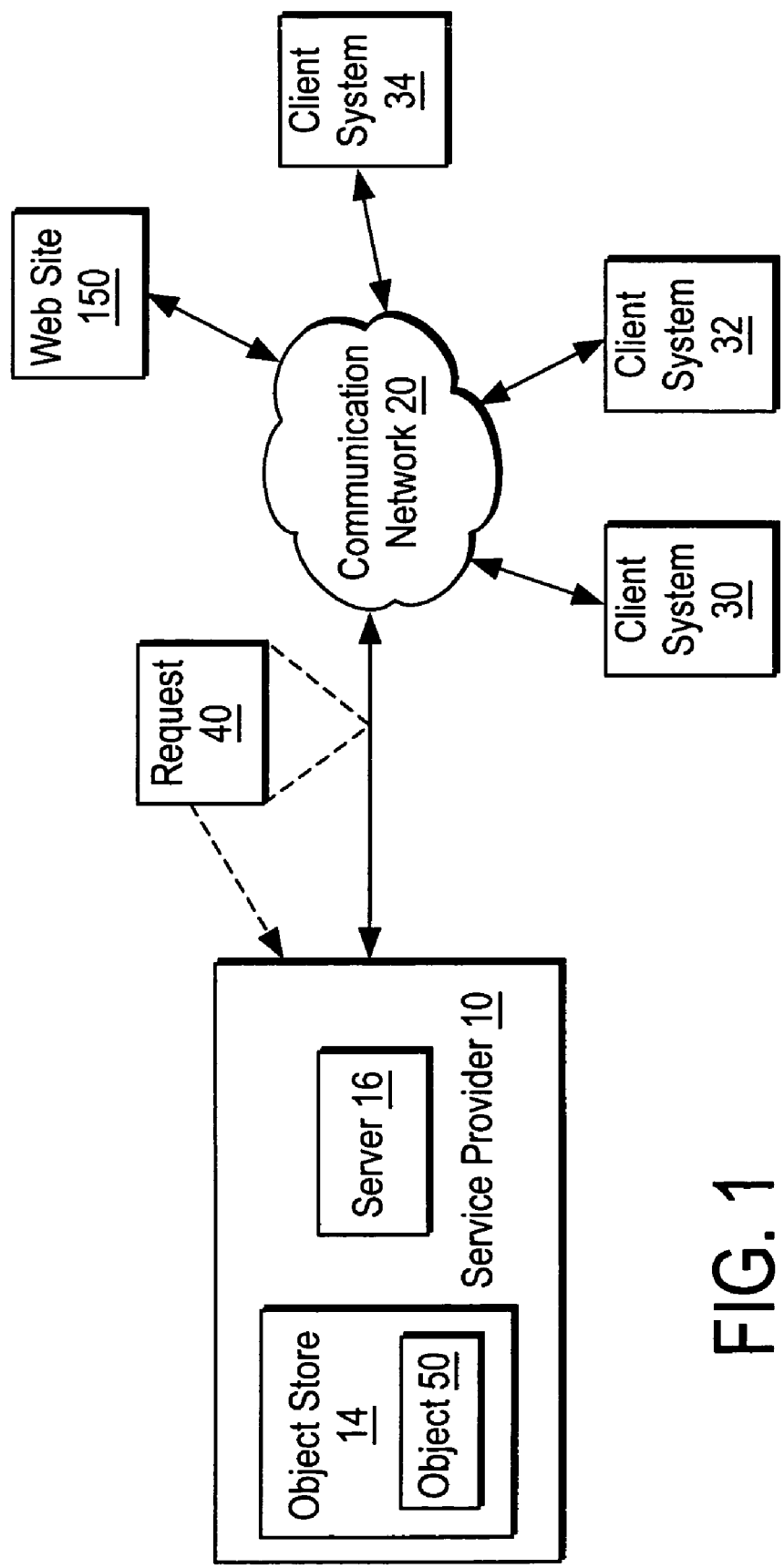
FIG. 1 shows a service provider that communicates with a set of client systems via a communication network.

FIG. 1 shows a service provider 10 including a server 16 that communicates with a set of client systems 30-34 via a communication network 20. The server 16 and the client systems 30-34 communicate via the communication network 20 in one embodiment using Internet web protocols.

The service provider 10 provides a computer-related service that is intended for use by authentic human clients of the service provider 10. An authentic human client of the service provider 10 is a human for whom the service provider 10 intends to provide a computer-related service. In one embodiment, the service provider 10 provides a computer-related service that is intended for use by individuals and an authentic human client is a human that seeks to use the computer-related service for their own personal use. Examples of a computer-related service that the service provider 10 intends for use by individuals include email services, personal web page services, personal data storage services, and web access accounts.

An individual that is not an authentic human client of the service provider 10 is an individual that seeks to abuse the computer-related services of the service provider 10. For example, an individual that seeks to create numerous accounts with a free email service of the service provider 10 is not an authentic human client. Similarly, an individual that seeks to create numerous free personal web page accounts with the service provider 10 is not an authentic human client. In addition, an un-suspecting human seeking entry into an enticing web site by passing a forged human test is not an authentic human client of the service provider 10.

For purposes of illustration, it is assumed in the following description that an individual user of the client system 30 is an authentic human client of the service provider 10. In addition, it is assumed in the following description that the users of the client systems 32-34 are not authentic human clients of the service provider 10. A user of the client system 32 is assumed to be an un-suspecting human seeking entry into a web site 150 and a user of the client system 34 is assumed to be an individual seeking to abusively create large numbers of accounts with the service provider 10. In addition, the web site 150 is run by an unscrupulous party who attempts to capture one or more objects from the service provider 10 and then present the captured objects to the user of the client system 32 in an entry page into the web site 150.

The server 16 in some embodiments of the service provider 10 includes mechanisms for protecting the service provider 10 from abuse by protecting against the capture of objects, e.g. an object 50, held in an object store 14 of the service provider 10. For example, the object 50 may be an object associated with a human test that is intended to be rendered only to authentic human clients of the service provider 10. The object 50 may be any type of object that may be rendered to a human. Examples for the object 50 include image objects, sound objects, text objects, movie objects, or any combination of images, sounds, and text.

The server 16 obtains a request 40 via the communication network 20 for the object 50. The request 40 may be an HTTP request generated by a web browser application executing on one of the client systems 30-34 as it renders a web page obtained from the service provider 10. The request 40 may be an HTTP request generated by a program running on the web site 150 that is attempting to capture the object 50.

In one embodiment, the server 16 protects against capture of the object 50 by serving the object 50 in response to the request 40 in a web page using an object format that is selected to prevent an object viewer from capturing the object 50 from the web page. For example, the object 50 may be included in a web page as a Macromedia Flash Object. A Macromedia plug-in viewer of a web browser does not allow the object 50 to be saved locally. This hinders attempts to capture the object 50 and then serve the object 50 from the web site 150. For example, if the object 50 is part of a human test of the service provider 10, the prevention of capture of the object 50 hinders attempts to re-create the human test at an entry page to the web site 150.

In another embodiment, the server 16 protects against capture of the object 50 by generating a web page for providing the object 50 such that an appearance of the object 50 in the web page changes over time. For example, the object 50 may be an animated GIF or a flash movie object that displays a sentence one word or several words at a time. An example sentence is "Can a horse fly?" and an animated GIF object may display "Can" followed a short time later by "a horse" followed a short time later by "fly?" The changes to the object 50 prevent it from being entirely captured by a screen snapshot operation on a client system, e.g. print screen, bit map captures, window snapping, etc. This hinders attempts to capture the object 50 and then present the object 50 from the web site 150.

In yet another embodiment, the server 16 protects against capture of the object 50 by generating a random unique name for the object 50 and storing the object 50 on the server 16 using the random unique name. The server 16 then generates a web page for providing the object 50 that specifies the random unique name. The server 16 deletes the object 50 under the random unique name after serving it in response to the request 40. This hinders attempts to capture the object 50 from storage in the server 16. For example, in a registration page that includes a human test, the object 50 is specified in the registration page using a random unique name on the server 16. A web browser when rendering the registration pages reads the file specified by the random unique name from the server 16. Thereafter, the server 16 deletes the file under the random unique name.

Figure 2:
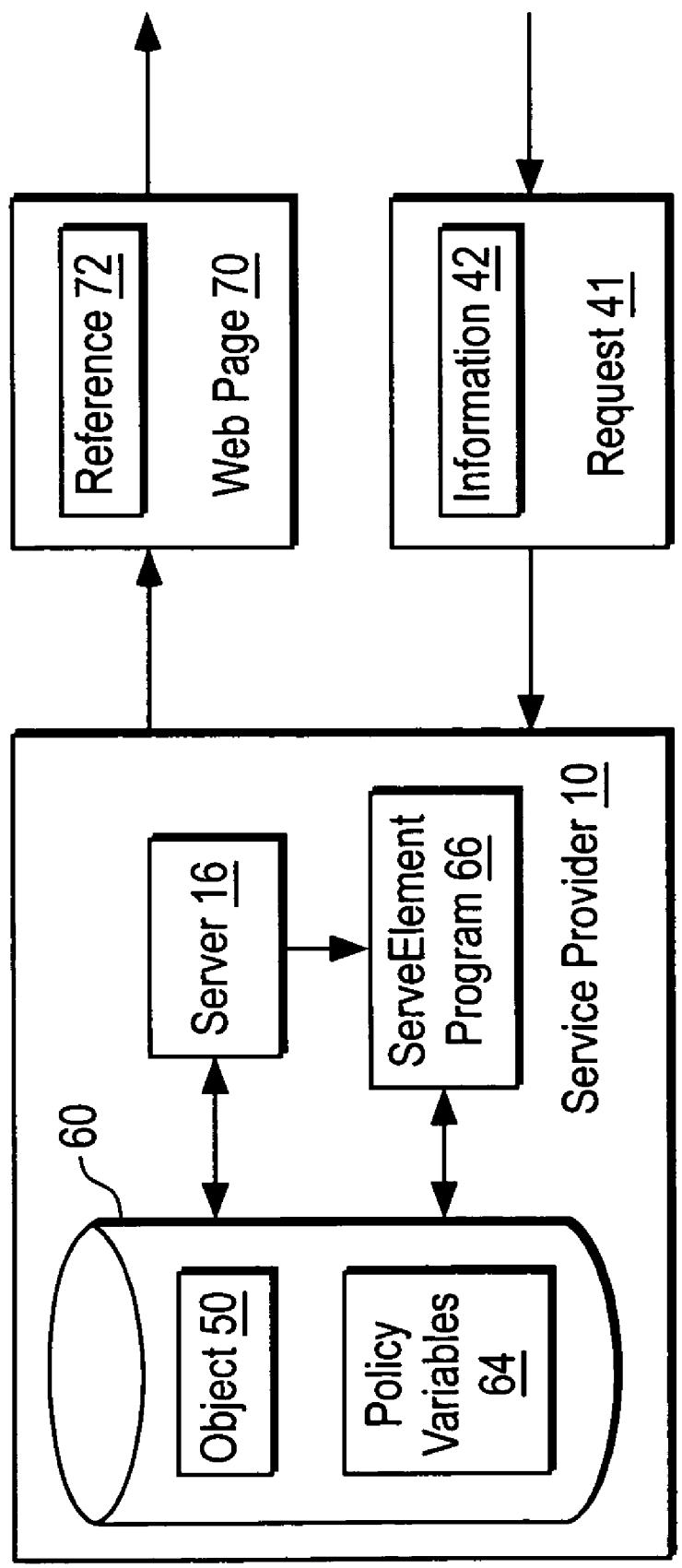
FIG. 2 shows an embodiment in which a service provider is protected from abuse by controlling access to an object using a set of policy variables.

FIG. 2 shows an embodiment in which the service provider 10 is protected from abuse by controlling access to the object 50 using a set of policy variables 64 that are associated with the object 50. In this embodiment, the service provider 10 includes a database 60 that holds objects for which accesses are to be controlled, e.g. the object 50.

The server 16 in this embodiment generates a web page 70 that includes a reference 72 to a ServeElement program 66. The reference 72 includes an argument parameter that references the object 50 in the database 60. For example, the web page 70 may be a registration page of a computer-related service of the service provider 10 with the object 50 as an element of a human test contained in the registration page.

A web browser on a client system responds to the web page 70 by sending a request 41 to the server 16. The request 41 includes a request to run the ServeElement program 66 with the argument that references the object 50 obtained from the reference 72. The request 41 includes a set of information 42 that may be used to determine whether or not to serve the object 50 in response to the request 41. The information 42 may include an indicator of the source of the request 41, e.g. an IP address of the system that generated the request 41. For example, if the client system 30 generated the request 41 then the information 42 in the request 41 includes an IP address associated with the client system 30. In one embodiment, the information 42 is an ASP request object that includes a system variables collection, e.g. HTTP_REFERER, REMOTE_ADDR, URL. In another embodiment, the information 42 is network level information pertaining to the request 41 obtained from an operating system of the server 16.

In response to the request 41, the server 16 runs the ServeElement program 66 with the argument that references the object 50 in the database 60. The ServeElement program 66 uses the policy variables 64 associated with the object 50 and the information 42 to determine whether or not to serve the object 50 in response to the request 41. In one embodiment, the policy variables 64 include a SourcetoAccept parameter and a TimesServed parameter. The SourcetoAccept parameter indicates an acceptable source for the request 41, i.e. an acceptable client for receiving the object 50, and the TimesServed parameter indicates a number of times that the object 50 has been served.

The ServeElement program 66 may determine whether or not to serve the object 50 in response to SourcetoAccept policy parameter and an IP address in the information 42. For example, if an IP address that specifies the source of the request 41 in the information 42 matches the SourcetoAccept policy parameter then the ServeElement program 66 may serve the object 50 in response to the request 41. On the other hand, if the IP address that specifies the source of the request 41 in the information 42 does not match the SourcetoAccept policy parameter then the ServeElement program 66 may not serve the object 50 in response to the request 41.

The ServeElement program 66 may determine whether or not to serve the object 50 in response to TimesServed policy parameter even if the SourcetoAccept policy parameter matches to the information 42. For example, if the TimesServed policy parameter is less than 1, or some other pre-selected number, then the ServeElement program 66 may serve the object 50 in response to the request 41. On the other hand, if the TimesServed policy parameter is greater than 1, or some other pre-selected number, then the ServeElement program 66 may not serve the object 50 in response to the request 41. Each time the ServeElement program 66 serves the object 50 it updates the policy variables 64 appropriately.

In one embodiment, the database 60 includes an object control table having a set of entries each for controlling access to a particular instance of the object 50. The information in an entry of the object control table for the object 50 includes a random unique name for the object 50, a static reference to the object 50, and the policy variables associated with the object 50.

The server 16 may create an entry in the object control table for each relevant communication transaction underway with a client that involves the object 50. For example, if the object 50 is part of a human test in a registration page for a computer-related service of the service provider 10, then the server 16 creates an entry in the object control table for the human test and writes in a random unique name for the object 50 into the entry and writes a static reference to the object 50 into the entry, and initializes the policy variables associated with the object 50 in the entry. The server 16 creates an entry in the object control table for each human test underway with its own random unique name and policy variables for serving the object 50.

The following are example contents of an entry in the object control table for the object 50.

| | |
|---|---|
| DynamicName: | 1BFA02639 |
| TableName: | PICTURETBL |
| KeyName: | PID |
| KeyValue: | 17 |
| TimesServed: | 0 |
| SourcetoAccept: | 10.10.10.21 |

The DynamicName of "1BFA02639" is a random unique name that the server 16 generates for the object 50. The TableName of "PICTURETBL," KeyName of "PID," and KeyValue of "17" provide a static reference to the object 50 which is stored in the table "PICTURETBL" in the database 60. The TimesServed of "0" and SourcetoAccept of "10.10.10.21" are initialized policy variables associated with the object 50. For example, if the object 50 is part of a human test in a registration page, then the server 16 initializes the policy parameter SourcetoAccept with the IP address of the client system that requested the registration page. Alternatively, the SourcetoAccept may be a URL of a system that directed the requesting client system to the registration page or a session identifier that is assigned by the server 16 to a communication interaction with a client system.

The reference 72 in the web page 70 includes an argument parameter set to the DynamicName of the object 50, i.e. "1BFA02639." The request 41 includes a request to run the ServeElement program 66 with the "1BFA02639" argument obtained from the reference 72. In response to the request 41, the server 16 runs the ServeElement program 66 with the "1BFA02639" argument. In one embodiment, the server 16 invokes ServeElement.asp?DynName=1BFA02639 in response to the request 41. The ServeElement program 66 uses the argument "1BFA02639" to perform a lookup to the object control table using DynamicName=1BFA02639. The ServeElement program 66 uses the information in the entry of the object control table for which DynamicName=1BFA02639 and the information 42 to locate the object 50 and to determine how to serve the object 50 in response to the request 41.

For example, the ServeElement program 66 uses the TableName of "PICTURETBL," KeyName of "PID," and KeyValue of "17" from the DynamicName=1BFA02639 entry of the object control table to locate the object 50 in the table "PICTURETBL" in the database 60. The ServeElement program 66 uses the values of the TimesServed and SourcetoAccept policy variables from the DynamicName=1BFA02639 entry of the object control table and the information 42 to determine whether or not to serve the object 50 in response to the request 41 as previously described. Each time the ServeElement program 66 serves the object 50 having the DynamicName=1BFA02639 it updates the corresponding policy variables appropriately.

Figure 3:
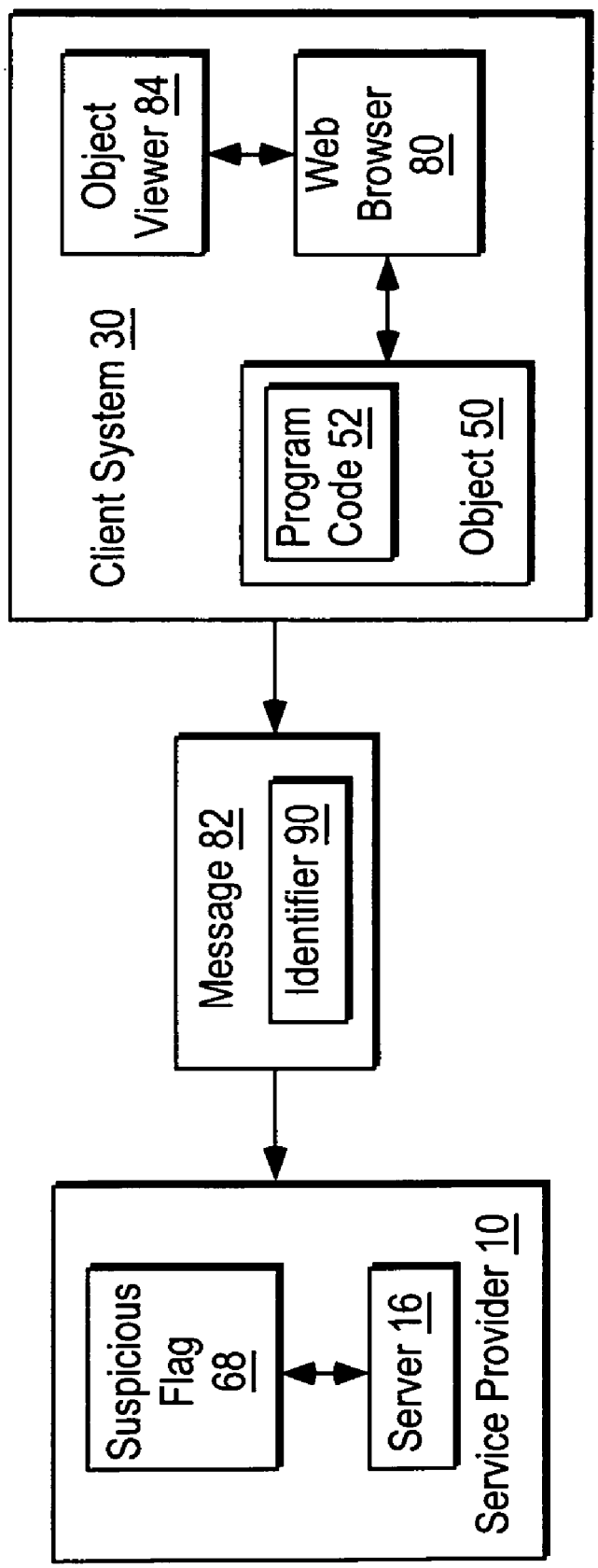
FIG. 3 shows an embodiment in which a service provider is protected from abuse by including a set of program code in an object.

FIG. 3 shows an embodiment in which the service provider 10 is protected from abuse by including a set of program code 52 in the object 50. In the example, shown, the object 50 has been served to the client system 30. The client system 30 includes a web browser 80 that obtained the object 50 from the service provider 10, e.g. using any of the techniques disclosed herein, and an object viewer 84 that corresponds to the object format of the object 50.

The server 16 in this embodiment sets a suspicious flag 68 when it serves the object 50 to the client system 30. The server 16 initially sets the suspicious flag 68 to indicate that the client system 30 is initially suspect as a possible abuser of the service provider 10.

The program code 52 when executed by the object viewer 84 transfers a message 82 back to the server 16. In one embodiment, the message 82 includes an identifier 90 that identifies the client system 30 as the location where the object 50 is being rendered. The identifier 90 may be an IP address of the client system 30. In response, the server 16 clears the suspicious flag 68 if the identifier 90 matches to the client system that was originally served the object 50. The server 16 does not clear the suspicious flag 68 if the identifier 90 does not match to the client system that was originally served the object 50. For example, an unscrupulous party may have captured the object 50 and served it to a client system not intended by the service provider 10 using the web site 150. In such a case the identifier 90 identifies the unintended client system.

In another embodiment, the identifier 90 identifies a location from which the object 50 was served and the server 16 uses that information to determine whether or not to clear the suspicious flag 68. For example, if the object 50 was served from the server 16 then the suspicious flag 68 is cleared and if the object 50 was served from the web site 150 then the suspicious flag 68 is not cleared. The location from which the object 50 was served may be indicated with a URL of the server that served the object 50.

In yet another embodiment, the identifier 90 identifies a location that referred the client system 30 to the object 50 on the service provider 10 and the server 16 uses that information to determine whether or not to clear the suspicious flag 68. For example, if the object 50 was referred by the web site 150 then the suspicious flag 68 is not cleared. The location that referred the object 50 may be indicated with a URL of a server, e.g. a server of the web site 150.

The suspicious flag 68 may be used by the server 16 to determine whether to continue a communication transaction. For example, if the object 50 is part of a human test by the service provider 10 then the server 16 in response to the suspicious flag 68 may treat a human client as suspicious even if the human client passed the human test. If the suspicious flag 68 for the object 50 is set then the server 16 may send a message to the object 50 that disables an object viewer for the object 50 from rendering the object 50.

In one embodiment, the object 50 is a Flash object and the program code 52 in the object 50 is a sequence of ActionScript commands using the LoadVariables( ) API or LoadVars( ) class to enable two-way communication with the server 16 at the service provider 10. The ActionScript communication commands provide security features offered by the newer Flash players, e.g. the inability to connect to a web site in a domain different than the one from which the object 50 was served. Accordingly, if the object 50 is captured it will not be able to communicate with the service provider 10 and the suspicious flag 68 will not be cleared.

The ServeElement program 66 may be used in combination with the program code 52 in the object 50. For example, after the object 50 has communicated with the service provider 10, the program code 52 may call the GetURL ActionScript command with the argument "ServeElement.asp?DynName=1BFA02639" where the string 1BFA023639 has been given as an initial parameter to the Flash object 50. This yields the benefits of Flash cross-domain security features as well the capability to serve the object 50 based on the policy variables discussed above.

Figure 4:
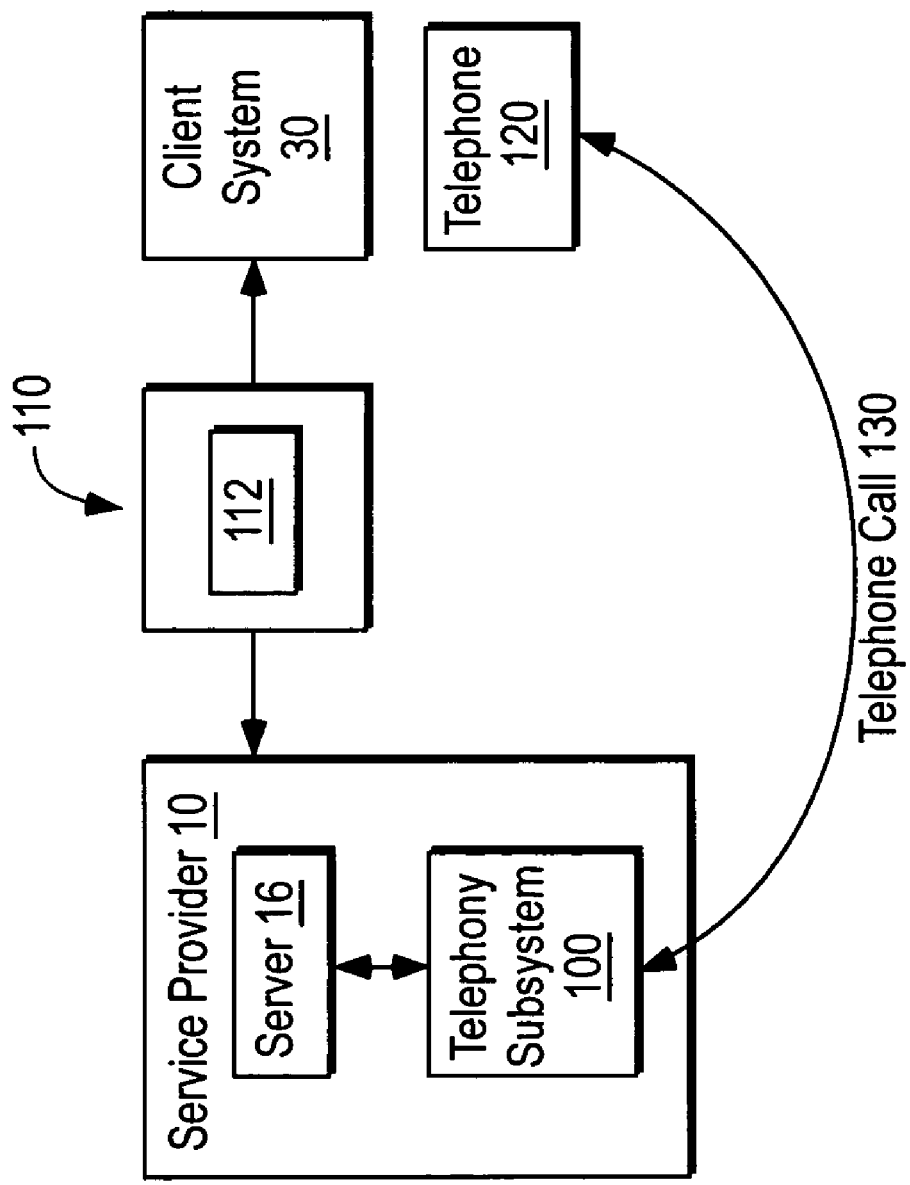
FIG. 4 shows an embodiment in which a service provider is protected from abuse by obtaining an input from a human client via an alternative communication path.

FIG. 4 shows an embodiment in which the service provider 10 is protected from abuse by obtaining an input from a human client via an alternative communication path. In one embodiment, the alternative communication path is a telephone call 130. The service provider 10 in this embodiment includes a telephony subsystem 100 that is capable of placing telephone calls and/or receiving telephone calls.

The server 16 in this embodiment generates a web page 110 that includes a field 112 that enables an individual using a web browser to enter a telephone number. For example, the web page 110 may be a registration page that the server 16 generates for a computer-related service of the service provider 10 that is intended for use by individual human clients.

The web page 110 prompts for entry of a telephone number. In the example shown, an individual using the client system 30 possesses a telephone 120. The individual enters the telephone number of the telephone 120 into the field 112. The contents of the field 112 are posted to the server 16 and the server 16 in response places the telephone call 130 to the telephone 120 using the telephone number from the field 112.

The server 16 prompts the individual in possession of the telephone 120 to provide a user input via the telephone call 130. For example, the server 16 may use voice synthesis to provide a voice prompt via the telephone call 130. The server 16 may prompt an individual to provide a voice response or to enter a response using a keypad of the telephone 120.

The voice prompt in the telephone call 130 may be pertain to a registration process for a computer-related service of the service provider 10. For example, the voice prompt in the telephone call 130 may pertain to a human test. An example human test via the telephone call 130 is "Can a horse fly? Press 1 for yes and 2 for no." Another example human test includes generating a web page that includes an image of a horse and a question "Can a horse fly?" and a voice prompt in the telephone call 130 "Press 1 for yes and 2 for no to the test shown on your screen."

Obtaining an input from a human client of the service provider 10 via an alternative communication path enables the service provider 10 to detect individuals, e.g. a low-paid overseas laborers, attempting to create large numbers of accounts with the service provider 10. The service provider 10 counts the numbers of accounts created that have the same telephone number. The service provider 10 may refuse to create accounts if the number corresponding to a particular telephone number exceeds a predetermined threshold. In addition, the service provider 10 may declare a failure of a human test if large numbers of test are being passed by an individual using the same telephone number.

Alternatively, the telephone call 130 may be initiated by the human client in possession of the telephone 120. The server 16 may employ caller-ID to ensure that that the telephone call 130 is from the human client that entered the telephone number in the web page 110.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for protecting a service provider from abuse comprising:
   receiving a web request for access to an object belonging to the service provider;
   serving the object in response to the web request in a manner that is selected to prevent the object from being used to abuse the service provider wherein serving comprises serving the object using an object format that is selected to prevent an object viewer from capturing the object by
   generating a random unique name for the object and storing the object under the random unique name;
   serving the object using the random unique name;
   deleting the object having the random unique name.

2. The method of claim 1, wherein the object is used for a screening of web registrations to a computer-related service of the service provider.

3. The method of claim 2, wherein serving comprises serving the object such that an appearance of the object changes over time.

4. The method of claim 2, wherein serving comprises controlling access to the object in response to a set of information pertaining to the web request.

5. The method of claim 4, wherein the information specifies a source of the web request.

6. The method of claim 4, wherein the information specifies a referrer to the object.

7. A method for protecting a service provider from abuse comprising:
   receiving a web request for access to an object belonging the service provider;
   serving the object in response to the web request in a manner that is selected to prevent the object from being used to abuse the service provider wherein serving comprises serving the object using an object format that is selected to prevent an object viewer from capturing the object by
   storing the object in a database under a random unique name;
   associating a static reference to the object and a set of policy variables to the random unique name;
   determining whether to serve the object in response to a request that specifies the random unique name and that further specifies a set of information pertaining to the web request.

8. The method of claim 7, wherein the object is used for a screening of web registrations to a computer-related service of the service provider.

9. The method of claim 8, wherein serving comprises serving the object such that an appearance of the object changes over time.

10. The method of claim 7, wherein the information specifies a source of the request.

11. The method of claim 7, wherein the information specifies a referrer to the object.

12. A method for protecting a service provider from abuse comprising:
   receiving a web request for access to an object belonging to the service provider;
   serving the object in response to the web request in a manner that is selected to prevent the object from being used to abuse the service provider wherein serving comprises serving the object using an object format that is selected to prevent an object viewer from capturing the object by
   providing a set of program code in the object such that the program code generates a message that indicates a location at which the object is rendered;
   sending a message to the object that disables an object viewer from rendering the object if the location is suspicious.

13. The method of claim 12, wherein the object is used for a screening of web registrations to a computer-related service of the service provider.

14. The method of claim 13, wherein serving comprises serving the object such that an appearance of the object changes over time.

15. The method of claim 13, wherein serving comprises controlling access to the object in response to a set of information pertaining to the web request.

16. The method of claim 15, wherein the information specifies a source of the request.

17. The method of claim 15, wherein the information specifies a referrer to the object.

* * * * *